United States Patent [19]

Nishimura et al.

[11] Patent Number: 5,030,320
[45] Date of Patent: Jul. 9, 1991

[54] CHEMICAL SURFACE TREATMENT APPARATUS AND PROCESS

[75] Inventors: Kazuyuki Nishimura; Yasuyuki Murase; Hirohiko Ikegaya, all of Iwata, Japan

[73] Assignee: Yamaha Hatsudoki Kabushiki Kaisha, Japan

[21] Appl. No.: 542,095

[22] Filed: Jun. 22, 1990

[30] Foreign Application Priority Data

Jul. 14, 1989 [JP] Japan .................................. 1-180370

[51] Int. Cl.$^5$ .......................... B44C 1/22; C23F 1/00; C03C 15/00; C03C 25/06
[52] U.S. Cl. .................................... 156/642; 156/656; 156/664; 156/345
[58] Field of Search ............... 156/642, 656, 664, 345; 134/10, 12, 22.11, 27, 101, 198, 200

[56] References Cited

U.S. PATENT DOCUMENTS 4,904,339 2/1990 Diehl et al. ..................... 156/642 X Primary Examiner—William A. Powell
Attorney, Agent, or Firm—Bacon & Thomas

[57] ABSTRACT

An apparatus and process for chemically treating a surface of a workpiece with a liquid solution that produces an environmentally harmful gaseous byproduct includes a water spray system for contacting and reacting the gaseous byproduct at the location where it is produced during the chemical treating process. The reacted byproduct is then carried away in the water stream and with the chemical treating solution for safe disposal and recovery. Residual unreacted gaseous byproduct is chemically treated at a separate location within the same apparatus layout used to process the workpiece.

17 Claims, 3 Drawing Sheets

CHEMICAL SURFACE TREATMENT APPARATUS AND PROCESS

BACKGROUND OF THE INVENTION

1. Field of the Invention

The invention relates to the field of chemical treatment of workpiece surfaces, for example, acidic etching of metal workpiece surfaces.

2. Description of Prior Art

High speed plating systems for metallic workpieces such as cylinders of internal combustion engines using automated handling equipment for the workpieces involves acidic etching of the cylinder bores in a high speed process wherein circulation of mixed acid etchant through the cylinder bore is used to etch the surface of the bore in preparation for a plating operation.

However, during the etching process, harmful gases such as oxides of nitrogen ($NO_x$) are produced and must be disposed of for safety and environmental reasons. In accordance with prior art solutions, separate handling systems for the dangerous and undesirable gaseous byproduct of the etching process must be provided, including appropriate conduits, pumps and other apparatus for safely conducting the gaseous byproduct away from the etching area to a disposal or recovery system. Such systems tend to be complex, costly and disadvantageous with respect to equipment layout.

Thus, the problem to be solved by the present invention is to eliminate the need to establish special apparatus to transport and deal with harmful gases produced during a chemical treatment process by recovering and eliminating the gases in a way to minimize costs and complexity of equipment layout.

BRIEF SUMMARY OF THE INVENTION

In accordance with the present invention, the problem of safely and efficiently recovering and eliminating harmful gases resulting from a surface chemical treatment operation is solved by exposing the gases at the treatment station during the treatment operation to a water mist spray to react or dissolve the gases and to carry them away for safe recovery and treatment in a circulating stream of water. Any residual harmful gases are neutralized or otherwise processed at a separate treatment station, preferably using a neutralizing chemical readily available in the equipment layout used to process the workpiece.

Preferably, a water mist spray is used to encourage a reaction between the mist and harmful gases generated during a chemical etching process of a metal workpiece which converts, for example, $NO_x$ and other harmful gases into dilute nitric acid solution (for example) which can be recovered and reused in the surface treatment solution. Thus, by establishing the water spray to eliminate and recover harmful gas, the need to provide special means for removing the gas from the chemical treatment zone and to recover and treat the gas is eliminated. Simplification of the surface treatment device is thereby enabled, with lower costs and simpler equipment layout.

In accordance with a preferred embodiment of the invention, it is also contemplated that residual harmful gas not reacted with water may be delivered to a concentrator or the like located in another portion of the chemical treating apparatus whereat a liquid capable of neutralizing the harmful gas is available and is mixed with the gas to cause its neutralization without the need for a separate treating system for the harmful gas. For example, a concentrator may be associated with a degreasing station including a supply of alkaline degreasing solution that can be mixed in the concentrator with the acidic gaseous byproduct of the etching process to thereby neutralize the acidic gas and cause its removal into the degreasing solution.

BRIEF DESCRIPTION OF THE DRAWINGS

With reference to the appended drawings, which illustrate an exemplary preferred embodiment of the invention.

DETAILED DESCRIPTION OF THE PREFERRED EMBODIMENT

Figure 2:
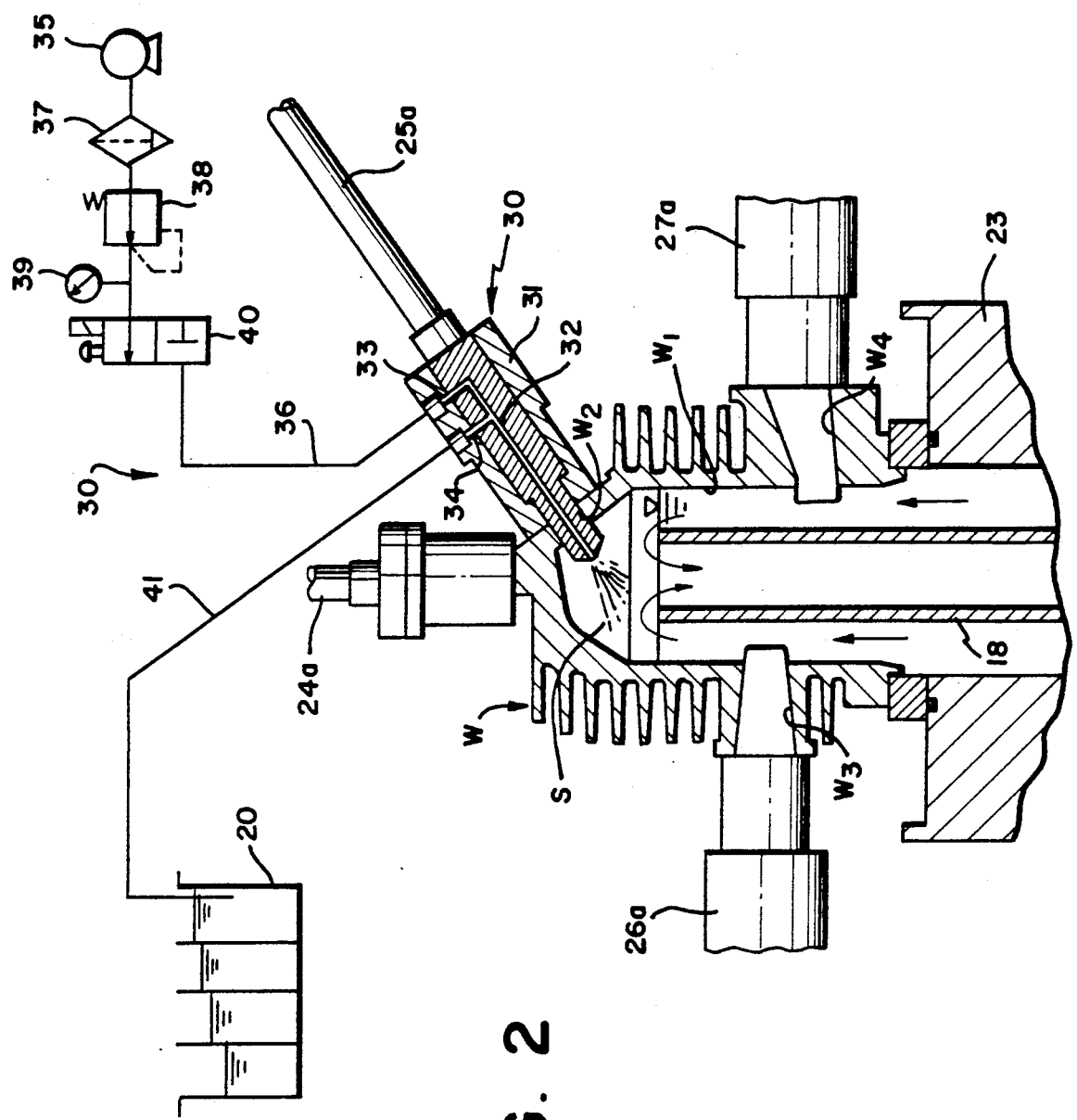
FIG. 2 is an enlarged detail view of the workpiece and etching apparatus during an etching operation.
Figure 3:
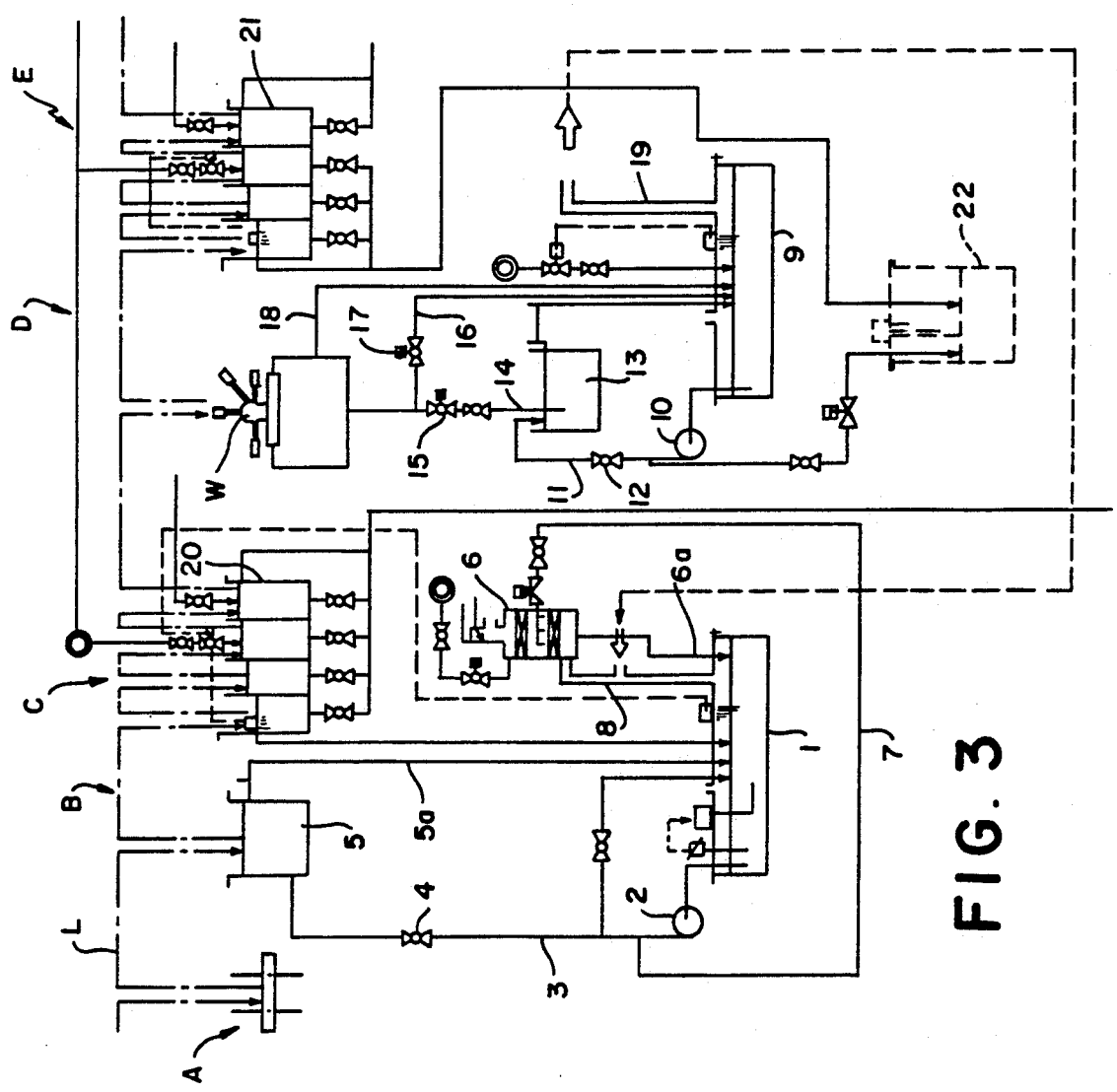
FIG. 3 is a schematic illustration of the principal components of the high speed plating system.

With reference to FIG. 3, an automated, high speed workpiece plating system is illustrated schematically to the extent required to provide information concerning the environment of the invention. In this context, the path of the movement of the workpiece is illustrated by the phantom lines L, which begin to the left of FIG. 3 at workstation A, which comprises a work entry unit for a workpiece W which, in this example, constitutes a unitized air cooled cylinder and head for an internal combustion engine, including a cylinder bore $W_1$ (FIG. 2). In FIG. 3, the workpiece is located at station D which constitutes a high speed, mixed acid etching workstation for the workpiece. Workstation B constitutes a degreasing unit and workstation C is a water rinse unit, while workstation E is a rinse water recovery unit. Thus, the workpiece W traverses workstations A-B-C-D-E in sequence in preparation for an eventual plating process (e.g. chrome plating) on the workpiece.

The degreasing unit B includes a degreasing solution reservoir tank 1 and a workpiece treating tank 5 in communication with the reservoir via pump 2, conduit 3 and flow control valve 4. Degreasing liquid is normally pumped to treatment tank 5 which then recirculates back to the reservoir tank 1 via conduit 5A.

Figure 4:
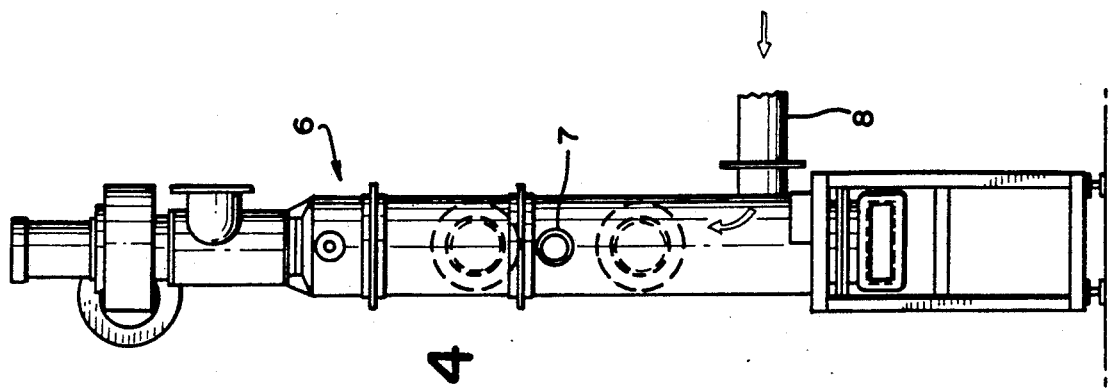
FIG. 4 is an enlarged detailed view of the concentrator unit of the plating system.

A concentrator 6 is associated with the degreaser workstation B to remove and vaporize excess water from the degreaser solution and return concentrated degreaser back to the reservoir 1. Thus, a conduit 7 in communication with the outlet side of pump 2 communicates with the concentrator 6 as illustrated, at which point the water is vaporized and carried to atmosphere while the concentrated degreaser liquid is returned to reservoir 1 via line 6A. In addition, a vapor conduit 8 provides communication between the upper portion of reservoir tank 1 and the concentrator 6 whereby degreaser vapors may be concentrated and returned to reservoir tank 1, while the water vapor component thereof is passed to atmosphere. A detailed view of the concentrator 6 is provided in FIG. 4, although it is to be noted that the concentrator per se does not constitute a part of the present invention.

The high speed workpiece etching workstation D (FIGS. 1 and 3) includes a mixed acid etching solution reservoir tank 9 which contains a conventional etchant constituting a mixed acid (in this example) that is appropriate for etching a metal workpiece such as the engine cylinder W illustrated in the drawings in preparation for a plating step. A pump 10 circulates etchant from reservoir tank 9 to intermediate tank 13 via line 11 and flow control valve 12. The etchant solution is then conveyed to the workpiece via line 14 and automatic filler valve 15, which will be described in more detail in connection with the description of FIG. 1 below. A return line 16 and drain valve 17 provides a return conduit for etchant from the workpiece W to the reservoir 9. An etchant return conduit 18, also to be described in more detail below, likewise provides a return path for circulating etchant from the workpiece W to the reservoir 9. A conduit 19 extends from the upper end of reservoir tank 9 above the etchant surface to line 8 at the degreaser workstation B.

Figure 1:
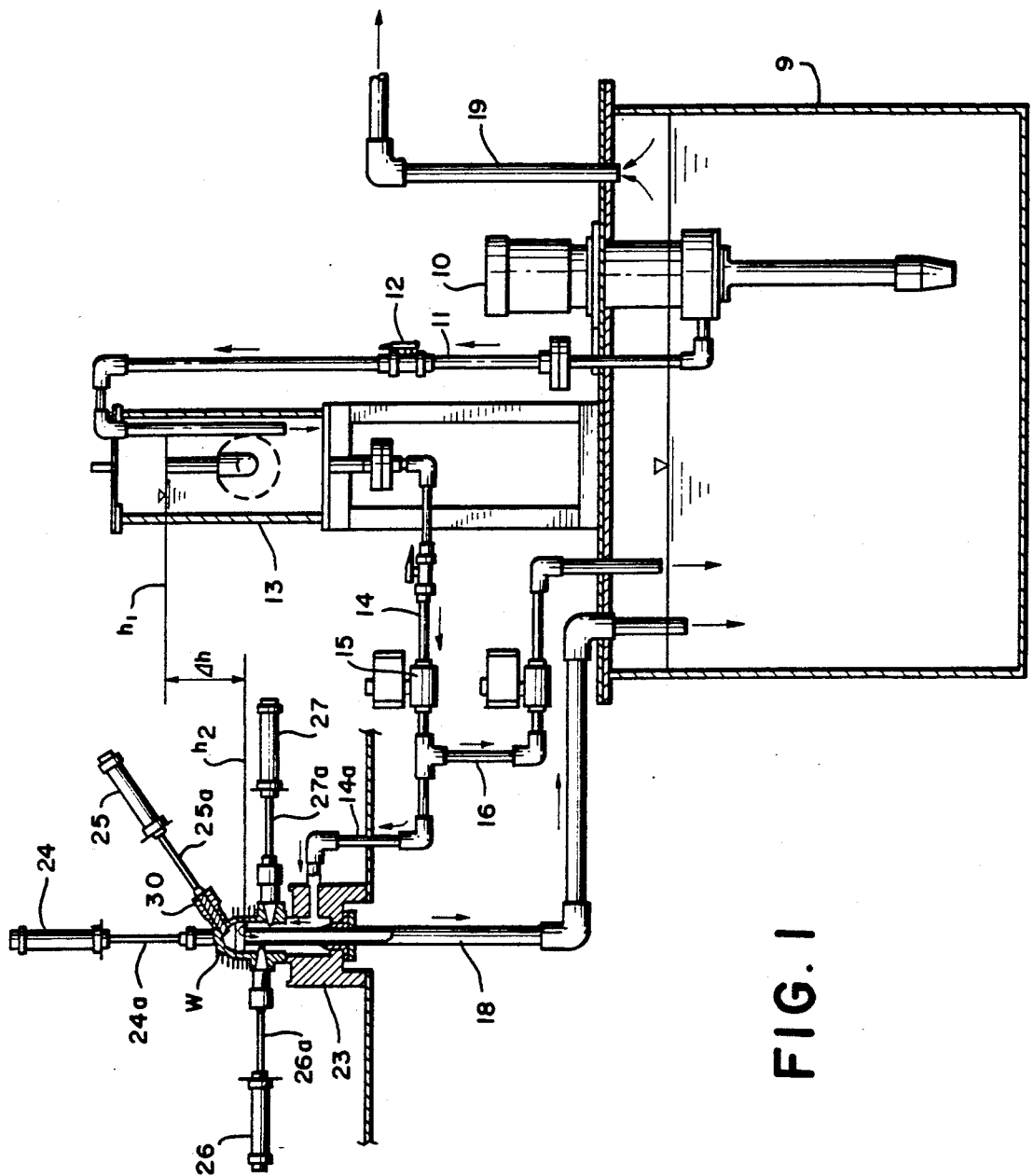
FIG. 1 is a schematic elevational cross section view of a mixed acid high speed etching workstation embodying the invention in a high speed automated plating system.

At workstation C, a series of water rinse tanks 20 is provided where the workpiece W is sequentially rinsed between the degreaser station B and the etching workstation D. With reference to FIG. 1, the etching workstation D is shown in greater detail, in particular the conduit arrangement whereby etchant is supplied to the interior of the workpiece W. Workpiece W is an integrated engine cylinder and head unit defining a closed ended chamber or bore $W_1$ mounted upon a jig 23 in fluid tight relationship by an appropriate automated positioning mechanism 24, 24A. The cylinder W normally will have various openings such as spark plug port $W_2$, exhaust port $W_3$ and intake port $W_4$ that are plugged in fluid tight relationship by plug rods 25A, 26A and 27A which are positioned automatically by actuating cylinders 25, 26 and 27. However, rod 25A includes a spray nozzle system 30 including a spray nozzle 31 shown in detail in FIG. 2. The nozzle includes an aperture 32 communicating with the distal end of the nozzle which is connected to an air supply port 33 and a water supply port 34. The air supply port 33 receives air from an air compressor 35 to which it is connected by pipe 36 including an oil filter 37, pressure regulator 38 and a pressure gage 39. An electromagnetic valve 40, for example, may also be provided to control air pressure supplied to line 36. The water supply port 34 is connected by conduit 41 to the rinse water recovery tank 20 at the rinse station C, which provides a source of water for the nozzle 30.

It will be noted that the etchant return conduit 18 extends upwardly into the interior of the cylinder chamber in workpiece W up to a predetermined elevation, while supply line 14 (see FIG. 1) communicates with etchant supply and drain line 14A which communicates with the cylinder interior from the jig 23 at a point below the workpiece W. The details of the conduits schematically illustrated in FIG. 3 are illustrated in FIG. 1, where like reference numerals refer to the same elements. Thus, it will be seen that the intermediate holding tank 13 receives etchant from reservoir tank 9 via pump 10 and lines 11, 12 until the etchant fills the holding tank 13 up to a predetermined level $h_1$. The etchant return line 18 having an open end disposed within the cylinder in workpiece W is positioned such that the open end of conduit 18 is disposed at elevation $h_2$, whereby the difference between the elevation $h_1$ and $h_2$ is established as $\Delta h$. This will result in a head $\Delta h$ of etchant solution which enables etchant to flow via line 14, 14A into the interior of workpiece $W_1$ via the jig 23. The etchant flows upwardly by gravitational force due to head $\Delta h$ until it reaches the open end of conduit 18 where it overflows the open end and returns to the reservoir tank 9. Automatic filler valve 15 and automatic drain valve 17 control the flow of etchant into and out of the workpiece interior during an etchant treatment and at the end of the treatment.

At workstation E, the etched workpiece is transported through a sequence of water rinse tanks 21 and from there is transported eventually to the plating workstation which is not illustrated and does not constitute part of the present invention. A mixed acid waste storage tank is provided at 22 in accordance with known practice.

In operation, in FIG. 3 it is seen how the workpiece cylinder W to be chemically surface treated has been transported to the mixed acid etching treatment station D from input station A, degreaser B and rinse water station C. As shown in FIGS. 1 and 2, the level $h_1$ of etchant in the intermediate tank 13 has been adjusted so that it is higher than the open end of return conduit 18 disposed within the cylinder of the workpiece W. Upon opening of the fill valve 15, etchant in tank 13 will flow by gravity via conduit 14, 14A into the lower end of jig 23 and up into the cylinder $W_1$ until it reaches the open end of the return conduit 18. Etchant will then overflow the open end of the conduit 18 and return to etchant reservoir tank 9, as shown in FIG. 1, while circulating through cylinder bore $W_1$. Etchant will remain at level $h_2$ in the cylinder $W_1$ to etch the surface of the workpiece defining the cylinder bore until flow from intermediate tank 13 ceases and return valve 17 is opened to permit etchant to drain from the interior of the cylinder via lines 14A and 16. Since the mixed acid etchant is supplied to the cylinder bore $W_1$ by the force of gravity, the bore is gently filled without splashing and undue agitation and without the danger of etchant contacting spray nozzle 31 at the upper end of the cylinder bore. The level of etchant in the cylinder bore $W_1$ may be varied by adjusting the height of the open end of conduit 18 relative to the cylinder bore by any suitable means (not illustrated).

During the etching process, gaseous byproducts typically are produced and which will rise to the upper end of the cylinder bore, which defines a confinement area for the gaseous byproduct. The gaseous byproduct will also tend to return to etchant tank 9 via conduit 18 if it is not otherwise impeded.

In accordance with the present invention, a water spray S is injected preferably as a fine mist into the confinement area above the surface of the etchant in the cylinder bore $W_1$ during the etching process. This entails activation of compressor 35 and the supply of compressed air via line 36 to air inlet port 33 which causes a reduced pressure to occur at water inlet port 34 drawing in water from water supply line 41 from water source 20, as previously described. The compressed air and water preferably forms a fine mist spray within the upper end of cylinder $W_1$ above the etchant in the cylinder which causes the gaseous byproduct of the etching process to react with the water and to be carried away via conduit 18 with the etchant and water supplied via the nozzle 30. The gaseous byproduct may react with water, as indicated previously, or may simply be dissolved in the water before being carried away and returned to the reservoir 9. In a practical embodiment, harmful gases such as $NO_x$ have been removed from the cylinder bore during a mixed acid etching process by reacting with the water spray mist, where a dilute nitric acid solution, for example, is formed. The dilute acid passes through return conduit 18 back through reservoir tank 9 where it may be recovered for use in the etching process. Clearly, contrary to prior art solutions, this arrangement makes it unnecessary to provide complex $NO_x$ conveying conduits and elimination or scrubbing towers while permitting high speed processing of the workpiece during high speed etching operations.

Moreover since water is used as the spray mist, water may be recovered eventually and recycled or exhausted as harmless vapor to atmosphere. In addition, any remaining unreacted $NO_x$ or other acidic gas not recovered in the water is taken by conduits 19 and 8 to the concentrator 6 located at the degreaser station B. Here, the alkali degreasing solution sprayed into the concentrator 6 by pipe 7 neutralizes the undesirable $NO_x$ and other acidic gases to render them harmless. The gases may then be recovered or eliminated from the system.

Notably, the provision of the drain line 14A below the workpiece results in the total elimination of etchant from the cylinder bore $W_1$ so that the workpiece does not drip from the workpiece as it is conveyed to the next station E where it is sequentially rinsed in water rinsing tanks 21.

While the invention has been described in connection with a high speed plating system, it is to be understood that the invention has application to other types of chemical treating apparatus wherein noxious or undesirable gaseous byproducts may be formed and which must be prevented from entering the environment. Thus, although the workpiece W has been described as an internal combustion engine cylinder, it is to be understood that the workpiece could be of any configuration provided that some means is provided for containing the gaseous byproduct while it is treated with the water spray. Moreover, the specific plumbing arrangement and chemical solution supply system are only exemplary and any known method and apparatus may be utilized to provide chemical treating solution to a workpiece without departing from the scope of the invention. Thus, the invention is only to be limited by the scope of the claims appended hereto and not by the specific embodiment of the invention described herein.

What is claimed is:

1. Apparatus for chemically treating a surface area of a workpiece comprising
   means for supplying a chemical solution to the workpiece surface area that reacts with the surface area to produce a water reactable gaseous byproduct;
   means for supplying water as a spray to the gaseous byproduct to react at least a portion of the byproduct with and entrain the same in the water;
   means for removing the water and entrained reacted byproduct from the workpiece.

2. The apparatus according to claim 1, including means for removing any residual unreacted gaseous byproduct from the workpiece; and means for chemically treating the residual gaseous byproduct.

3. The apparatus according to claim 2, wherein said residual gaseous byproduct comprises an acidic gas and said chemical treatment means for said residual gaseous byproduct comprises means for neutralizing the acidic gas.

4. The apparatus according to claim 3, wherein said means for chemically treating said acidic gas comprises a concentrator device, said concentrator device associated with a degreasing unit separate from said chemical solution supplying means, said degreasing unit including an alkaline degreasing solution and means for circulating said degreasing solution to said concentrator and into contact with said acidic gas.

5. The apparatus according to claim 1, including means for confining said gaseous byproduct to a confinement area; said means for supplying water including means for spraying the water into said confinement area in contact with said gaseous byproduct; and said means for removing the water and entrained reaction byproduct including a water outlet in communication with said confinement area.

6. The apparatus according to claim 5, wherein said confinement area is defined by the workpiece.

7. The apparatus according to claim 6, wherein said confinement area is defined by the workpiece surface area to which said chemical solution is supplied, and wherein said means for supplying the chemical solution to said surface area includes means for circulating the chemical solution as a circulating stream moving into and out of the confinement area; a chemical solution inlet and outlet in communication with the confinement area; said solution outlet and water outlet constituting one and the same outlet, whereby the solution, water and entrained reacted byproduct merge together to exit the confinement area.

8. The apparatus according to claim 1, wherein said water supply means includes a compressed air driven ejector nozzle for generating the water spray, including means for supplying compressed air and water to the ejector nozzle.

9. The apparatus according to claim 1, including means for confining said gaseous byproduct to a confinement area; said means for supplying water includes means for spraying the water into said confinement area in contact with said gaseous byproduct; and said means for removing the water and entrained reaction byproduct includes a water outlet in communication with said confinement area; said means for spraying the water into said confinement area including a movable air driven ejector nozzle and means for moving the nozzle into and out of communication with said confinement area; and means for supplying air and water to the ejector nozzle.

10. the apparatus according to claim 1, wherein said surface area defines at least in part a confinement chamber;
    chemical solution inlet and outlet means communicating with the chamber for enabling supply and removal of the solution into and out of the chamber;
    said means for supplying water comprising a spray nozzle in communication with the chamber;
    said water and entrained reacted byproduct removing means comprising said solution outlet means.

11. The apparatus according to claim 10, wherein said means for supplying said chemical solution is arranged to partially fill said confinement chamber leaving a volume in the chamber above any solution therein for containing gaseous byproduct of the treating process; said spray nozzle arranged to direct water spray into said volume.

12. The apparatus according to claims 1 or 10, including a water rinse station for water rinsing the workpiece, the water rinse station including a volume of water; said means for supplying water including means for conveying water from said volume of water to said gaseous byproduct.

13. The apparatus according to claim 11, including means for removing any residual byproduct from the workpiece; a degreaser station for degreasing the workpiece, said degreaser station including a volume of degreaser in a water solution; concentrator means for removing water from the degreaser and water solution; means for conveying the residual gaseous byproduct to the concentrator; means associated with the concentrator for chemically treating said reaction byproduct.

14. A process for removing a water reactable gaseous byproduct generated during a chemical surface treatment of surfaces of a workpiece, comprising subjecting the workpiece surfaces to a chemical treatment solution while providing a trapped volume adjacent the workpiece surfaces free of treatment solution for receiving the gaseous byproduct of the chemical treatment process;

injecting a water spray into the trapped volume to react and entrain the byproduct with the water;

removing the water and entrained reacted byproduct from the trapped volume.

15. The process according to claim 14, wherein said gaseous byproduct is an acidic gas, including removing any residual unreacted byproduct from the trapped volume and neutralizing the acidic gas by contacting same with an alkaline liquid.

16. The process according to claim 15, wherein the trapped volume is a chamber in the workpiece defined by said surfaces; wherein the chamber has a closed upper end; and wherein the step of providing a trapped volume includes partially filling the chamber with treatment solution to leave the trapped volume at the upper end of the chamber above the level of the treatment solution.

17. The process according to claim 16, including forming the water spray by injecting water into a compressed air stream delivered to the trapped volume.

* * * * *